United States Patent [19]
Paul et al.

[11] 3,939,702
[45] Feb. 24, 1976

[54] ENGINE TORQUE SENSOR DEVICE

[75] Inventors: Howard C. Paul, Des Plaines; John J. Tuzson, Evanston, both of Ill.

[73] Assignee: Borg-Warner Corporation, Chicago, Ill.

[22] Filed: May 31, 1973

[21] Appl. No.: 365,779

[52] U.S. Cl. ................................................ 73/115
[51] Int. Cl.² ....................................... G01M 15/00
[58] Field of Search ............... 73/115, 389, 407 PR; 137/557; 74/856, 861

[56] References Cited
UNITED STATES PATENTS

| | | | |
|---|---|---|---|
| 2,558,534 | 6/1951 | Bentley | 73/389 |
| 3,371,537 | 3/1968 | Kiene | 73/115 X |
| 3,440,870 | 5/1969 | Leto | 73/115 |
| 3,511,115 | 5/1970 | Forster | 74/861 |
| 3,882,740 | 5/1975 | Forster et al. | 74/866 |

*Primary Examiner*—Jerry W. Myracle
*Attorney, Agent, or Firm*—Robert L. Zieg

[57] ABSTRACT

A device for developing a signal indicative of the torque load on an internal combustion engine and particularly suited to provide said signal for an automatic transmission to be driven by said engine comprising actuator means having a piston movable in response to a pressure. The torque sensing device is adapted to be connected to one or more cylinders of the internal combustion engine so that said device is actuated by the average cylinder pressure as an indication of engine torque load.

8 Claims, 5 Drawing Figures

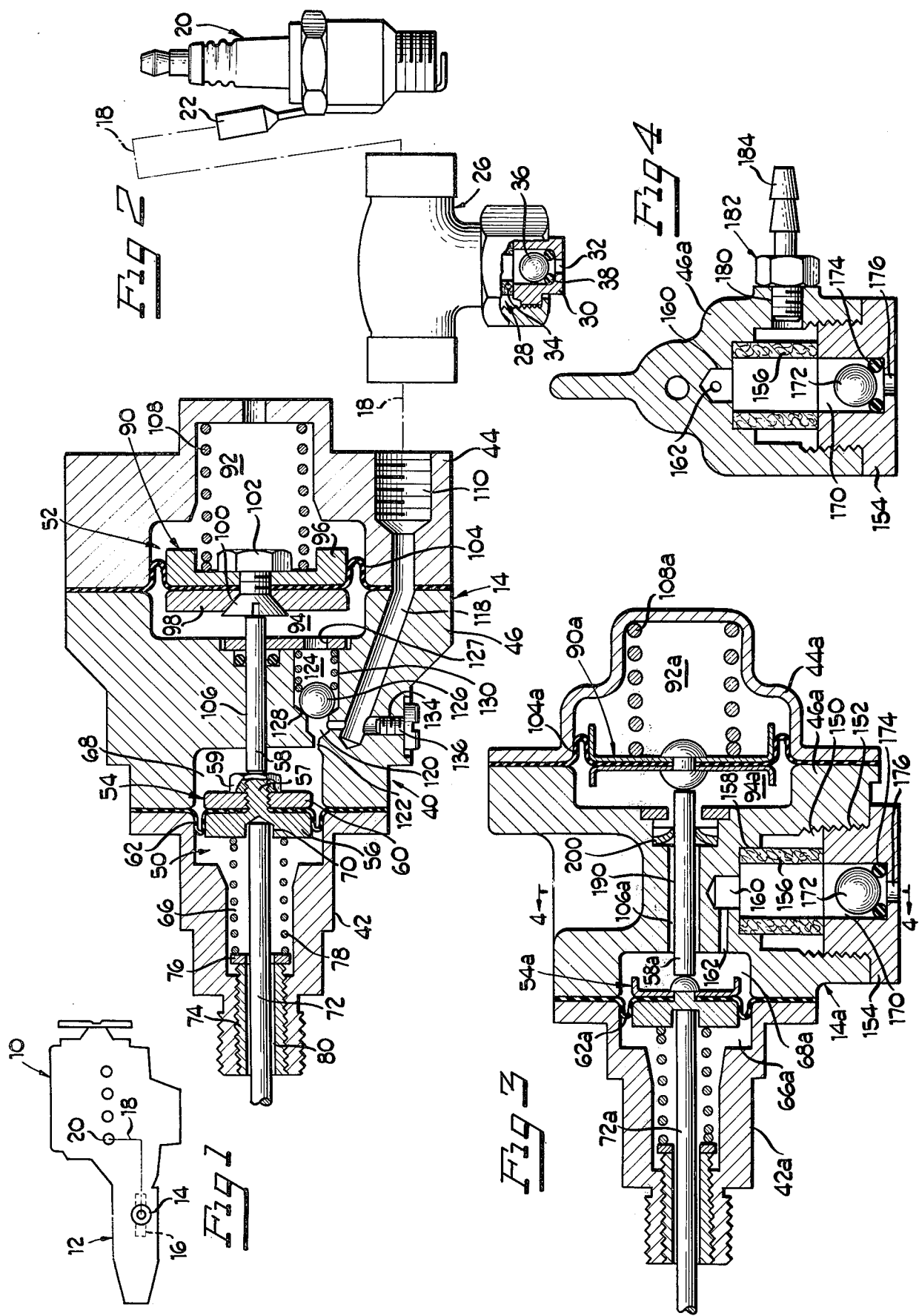

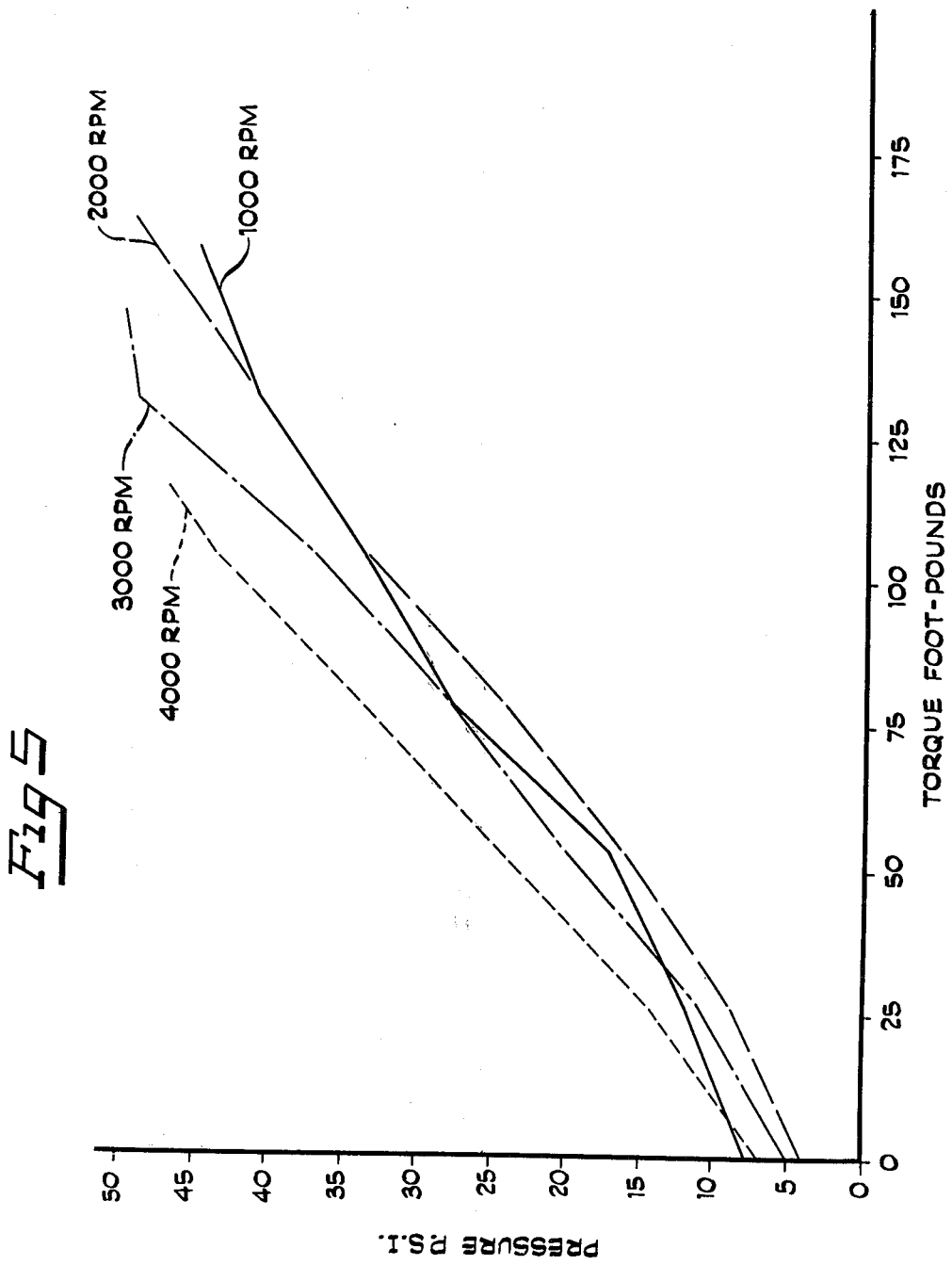

ENGINE TORQUE SENSOR DEVICE

SUMMARY OF THE INVENTION

In the field of automatic transmissions and controls therefor it has been known; as for example as illustrated in U.S. Pat. No. 3,117,464; to provide a control signal for the control system of an automatic transmission which responds to engine throttle position (see FIG. 4b of the patent) and further it has been known to provide a control signal responsive to the engine intake manifold vacuum for the transmission control system (see FIG. 5b of the above patent). When the intake manifold vacuum is used as a control signal, in some instances as a signal to control the pressures within the transmission control system, and in some instances to further have an effect on the time at which the transmission will change ratio, the manifold vacuum signal is used since it has been thought to be one of the best indicators of both the operator demand on the vehicle engine and the actual engine torque load at a given time. However, at the present time in the automotive industry as more complex control mechanisms are being developed for internal combustion engines to reduce objectionable exhaust emissions, it has been found that the intake manifold vacuum signal is no longer a reliable signal and further it does not tend to vary within as wide a limit as previously, so that difficulty is experienced in attempting to utilize this signal as a control signal for the automatic transmission.

To alleviate the above difficulty with the intake manifold vacuum pressure as a control signal, the present invention provides for a means for developing a signal directly responsive to the engine torque output and using this signal as a control signal for an automatic transmission control mechanism. The device comprises an actuator which can be attached to the automatic transmission control system which will replace the presently used actuator which is connected to engine intake manifold vacuum. This actuator is connected to one or more of the internal combustion engine cylinders and thereby receives the average pressure within the cylinders. It has been found that the average engine cylinder pressure varies in direct proportion to the engine torque output and that this is a reliable indicator of the torque output. The inventive and novel actuator described herein provides a means movable by the average cylinder pressure which movable means is adapted to actuate a valve or other device within the automatic transmission control mechanism as a function of the engine torque load.

DESCRIPTION OF THE DRAWINGS

FIG. 1 is a schematic view of an engine and transmission with a valve actuator attached thereto embodying the invention;

FIG. 2 is a cross-sectional view through the actuator of FIG. 1;

FIG. 3 is a cross-sectional view of a modified form of actuator similar to the actuator of FIG. 2;

FIG. 4 is a view taken along the lines 4—4 of FIG. 3; and

FIG. 5 is a graph illustrating the correlation between engine cylinder pressure and engine torque load.

Referring to FIG. 1, there is shown in schematic view, an internal combustion engine 10 for an automotive vehicle having an automatic transmission 12 attached thereto and including a torque responsive actuator or device 14 mounted in association with control mechanism 16 for the automatic transmission. The actuator 14 is connected by a conduit 18 to a spark plug 20 of the engine 10.

Referring to FIG. 2, the actuator 14 is illustrated in cross-section and shown connected by a conduit 18 to the spark plug 20 for the engine 10. The spark plug 20 has a connector 22 which is connected to an orifice (not illustrated) within the spark plug 20 which leads to the gap end of the spark plug such that when the spark plug 20 is mounted in the engine 10 the orifice within the plug will be exposed to the interior of the cylinder of the engine. Spark plug 20 is of a type commercially available and provides a convenient way of gaining access to the engine cylinder. It will be understood that in commercial use of the present invention other means of gaining access to the engine cylinder may be advisable such as, for example, a direct path into the engine cylinder through the wall of the cylinder. However, the present invention is illustrated as used with spark plug 20 since for the purposes of test and development such spark plugs were available and provided a simple means of determining the operativeness and effectiveness of the present invention.

Provided in the conduit 18 which is adapted to communicate the gas pressure within the engine cylinder to the device 14 is provided a filter and moisture removing or vent valve 26 which is illustrated as a valve having three ports, one of the ports indicated as port 28. Port 28 receives a plug 30 having a small drain orifice 32 therein. The plug 30 retains a filter 34 which is adapted to filter the gas flowing through the valve 26 to the torque device 14. A small ball 36 provided within plug 30 rests upon an O-ring seal 38. The valve 26 is adapted to provide for filtering of the gas from the engine cylinder and in addition, any moisture which is included in the gas flowing through the valve will condense within the valve 26 and collect in the lower portion in plug 30 and seep past valve ball 36 allowing the liquid to drain out hole 32. Normally, this would occur when the engine is not operating since at that time there is no pressure within the conduit 18 which would tend to keep the ball 36 seated upon O-ring 38.

The actuator 14 comprises a three-piece housing 40 comprising end sections 42 and 44, separated by a middle section 46. The housing may be constructed of any known materials for this purpose including certain types of plastic, aluminum, steel or cast iron and the sections 42, 46, 44 may be joined by any known method such as by bolts (not illustrated) which would extend through the end sections into the middle section to secure same together. In the case of aluminum or steel the end and middle sections could be joined by welding to provide a unitary housing.

The sections 42 and 46 are recessed to provide a chamber 50 and the sections 46 and 44 are recessed to provide a chamber 52. The chamber 50 includes therein a piston 54 comprised of a flange 56 having a short threaded extension 57. Mounted on the extension 57 is a sealing nut 59 having a flange 60 thereon. Provided between the flanges 56 and 60 is a flexible diaphragm 62 which may be of rubber or other flexible material. The diaphragm 62 extends also between the housing sections 42 and 46 such that it can provide for sealing between the housing sections 42 and 46. The sealing nut 59 is threaded internally to engage threads on extension 57 such that the sealing nut 59 can be tightened to tightly engage the diaphragm 62 against the flange 56 to effect a sealed piston member dividing the chamber 50 into a spring or bias chamber 66 and an actuating chamber 68.

The flange 56 has a bore 70 therein which receives the end of an actuating rod 72. The actuating rod 72 is adapted to extend within the housing of the automatic controls for the transmission mechanism to actuate a valve or other means within the transmission. A spring retaining member 74 is provided which is threaded to engage internal threads in end section 42, the member 74 being engaged with a retaining flange 76. The flange 76 engages a spring 78 which in turn engages the piston 54 to act as a return spring for the piston 54 urging same to the right as illustrated in FIG. 2. The member 74 further includes a central bore 80 through which the rod 72 extends.

Similar to the piston 54, a piston 90 is provided within the chamber 52 which divides the chamber 52 into a spring chamber 92 and an actuating chamber 94. The piston 90 comprises flange members 96 and 98 which are adapted to be secured together by a screw 100 and nut 102. A diaphragm member 104 is provided which is of flexible material so as to provide a seal between chamber 94 and 92. The screw 100 and nut 102 are tightened to secure the flanges 98 and 96 together with the diaphragm 104 therebetween to provide a sealed piston within chamber 52. The diaphragm 104 similar to diaphragm 62 further extends between housing sections 46 and 44 to provide seal when the housing sections are assembled together.

A rod 58 is provided, reciprocable in a bore 106 in housing section 46, and engaging the piston 90 so as to be movable by piston 90. The chamber 92 further has mounted therein a spring 108 which engages the piston 90 to urge same to the left as illustrated in FIG. 2.

Middle housing section 46 includes a conduit 118 which is connected to the port 110. Conduit 118 is connected to a stepped bore 120 which extends between chambers 50 and 52. The bore 120 has an orifice 122 providing communication with actuating chamber 68 for piston 54. The bore 120 has an enlarged chamber 124 which is connected through an orifice 127 to the chamber 94 for piston 90. A ball 126 is provided to engage a seat 128 provided within bore 120. A spring 130 engages ball 126 to urge the ball against the seat 128. A bore 134 is provided between the exterior of middle housing section 46 and conduit 118 which is closed by a screw 136. The bore 134 provides access to drill a connection between passage 118 and bore 120.

The operation of the torque sensor device 14 described above is in general to provide a signal to the automatic transmission proportional to engine torque load. As illustrated in FIG. 2, the torque device 14 receives, by means of conduit 18, the pressure within one or more cylinders of the engine 10. This pressure is admitted through conduit 118 and orifice 122 into actuating chamber 68 whereupon the pressure will act upon the piston 54 to move same to the left, as illustrated in FIG. 2 against the force of spring 78 to move actuating rod 72 and thereby actuate a valve or other device within the control system for the automatic transmission. Thus a signal proportional to engine torque load is provided for control of the automatic transmission which may, for example, be a control of the type as illustrated in U.S. Pat. No. 3,117,464, having a valve such as illustrated in FIG. 5b which is adapted to control shift points and pressure within the automatic transmission. When the pressure within the cylinder of the engine decreases reflecting decreasing engine torque load, spring 78 will return piston 54 toward the right to move actuating rod 72 to the right to indicate the decreasing torque load to the transmission control. The cylinder pressure within conduit 118 is also admitted past the ball 126 into chamber 94 by moving ball 126 against spring 130 and then through orifice 127 to actuate the piston 90 and move same to the right against the force of spring 108 for the purposes which will be described below.

During the normal course of operation of a vehicle high pressure will prevail in conduit 18 at least for a short duration, either because the vehicle is being accelerated resulting in high average cylinder pressure, or because, at low speed and idle conditions, periodic pressure pulsation will be propagated in conduit 18. An instantaneous high pressure in conduit 18 and bore 120 will be communicated to chamber 94 by lifting ball 126 from seat 128. When the pressure reduces in passage 120, the ball 126 seats and the high pressure is retained in chamber 94 for a period of time providing a delayed response of piston 90 on rod 58. The pressure is chamber 94 will gradually bleed off through the clearance between bore 106 and rod 58 to be equalized with that in bore 120. It will be apparent that other types of check valve structures such as a reed valve could be used in place of the ball check valve illustrated.

The piston 90 is provided as a safety mechanism or fail-safe device. If line 18 should become blocked or break so as to exhaust all pressure within conduit 18 and conduit 118 while the engine is operating, the spring 78 would move piston 54 all the way to the right indicating to the transmission that there is no engine torque load. Under these conditions the transmission control system would have low hydraulic pressure due to low indicated torque and the friction elements within the transmission could be damaged by slipping as the vehicle is driven. The piston 90, having no pressure imposed thereon, will at this time be actuated by spring 108 to move rod 72 via rod 58 all the way to the left to indicate to the transmission high engine torque load. Thus, if there is a loss of pressure in conduit 18, the transmission will continue to operate and will develop pressures adequate to keep the friction elements of the transmission from slipping even at high actual engine torque load.

A modified form of torque device 14 is illustrated in FIGS. 3 and 4 which generally comprises an actuator 14a constructed with the drain and filter valve 26 built into the device 14. The device 14a of FIG. 3 is quite similar to device 14 of FIG. 2 and identical or similar elements carry identical numbers with the addition of a suffix a.

The middle section 46a of device 14a includes a bore 150 having a plug 154 therein. Plug 154 engages a hollow filter element 156. The filter element 156 engages within a counter-bore 158 in the bore 150. An additional counter-bore 160 is provided in section 46a which is connected by means of an orifice 162 with the actuating chamber 68a. Plug 154 includes a counter-bore 170 receiving a ball 172 which may be of plastic or other material, ball 172 engaging an O-ring seal 174 which in turn surrounds a drain hole 176, as illustrated in FIG. 4.

A bore 180 is provided in the side wall of section 46a which receives a threaded fitting 182 having a nipple 184 thereon adapted to have conduit 18 connected thereto so that the cylinder pressure in conduit 18 is thus connected to the interior of bore 150 whereby it may flow through filter 156 and the interior thereof through counter-bore 160 and orifice 162 into actuating chamber 68a.

As will be recognized, the device 14a operates in an identical manner to the device 14 of FIG. 2 with the exception that the filter and moisture drain valve is built within the housing section 46 and further with the additional distinction that a large clearance 190 and a lip type seal 200 are provided within the bore 106a so that rising pressure in chamber 94a to move piston 90a to the right against the force of spring 108a and inactivate same is communicated directly from chamber 68a through the clearance 190. When the pressure in chamber 68a is falling the lip type seal 200 prevents return flow and high pressure is retained in chamber 94a. The seal 200 thus performs the function performed by ball 126 in the structure of FIG. 2. As in the case of the FIG. 2 construction, the pressure in chamber 94a will gradually bleed off past seal 200 through passage 190.

Optionally, a small bleed orifice could be provided in communication with chamber 94a to perform the bleed-off function.

The graph of FIG. 5 illustrates the correlation which has been found to exist between the engine torque output and the average cylinder pressure within an internal combustion engine at four different engine RPM settings. These results were obtained through actual dynamometer tests and prove that the engine cylinder pressure is proportional to engine torque load and may be used as a reliable signal indicative of engine torque load.

From the above description it will be apparent that the present invention provides a unique method and apparatus for sensing engine torque load and in addition providing a means for controlling an automatic transmission with a signal which is directly proportional to the engine torque load. Conveniently the device is adapted to be attached to the transmission mechanism at the same location and by means similar to the vacuum valves presently being used in automatic transmissions. The torque device 14 of the present invention includes a safety feature such that even if there is a break in the connection to the engine cylinder pressure, the torque device 14 will still indicate a high torque load to prevent slipping of the friction elements of the transmission which could be destructive.

It should be understood that the torque device 14 may be made out of various materials suitable to house a valve of the present type. In addition it will be apparent that the device 14 can be made with pistons of various materials and sizes and that the mechanism for removing moisture from the cylinder pressure conduit 18 may be of any known structure adapted to perform that function. It will also be obvious that although the present invention is used in connection with a spark plug having an orifice therein to provide communication to the engine cylinder, other methods will become readily apparent of providing communication between the torque device 14 and the engine cylinders. For example, a direct tap into the engine cylinder through an orifice could be used which would be suitable for use with diesel engines or others not of the spark-ignition type.

It is believed that the present device is advantageous in overcoming the objectionable operation of intake manifold vacuum actuated valves presently used in automatic transmission controls which are objectionable due to the unreliability of the vacuum signal because of the exhaust emission devices presently being installed on automotive engines. The device of the present invention will also automatically compensate for deterioration of engine output torque with use due to loss of compression or other causes such as poor spark timing for which the manifold vacuum signal cannot compensate.

Various features of the invention have been particularly shown and described; however, it should be obvious to one skilled in the art that modifications may be made therein without departing from the scope of the invention as defined by the claims which follow.

What is claimed is:

1. A mechanism for developing a signal responsive to torque output of an internal combustion automotive engine, an automatic transmission for said engine, a control mechanism for said automatic transmission, said mechanism comprising a pressure responsive actuator connected to said control mechanism, said pressure responsive actuator having a pressure chamber with a piston therein movable in response to a pressure applied to said actuator, said piston comprising a flexible diaphragm, means connecting said chamber to at least one cylinder of said engine whereby said piston will be actuated by the average pressure in said cylinder to provide said control mechanism with an indication of torque load.

2. A mechanism for developing a signal responsive to torque output of an internal combustion automotive engine, an automatic transmission for said engine, a control mechanism for said automatic transmission, said mechanism comprising a pressure responsive actuator connected to said control mechanisms, said pressure responsive actuator having means movable in response to a pressure applied to said actuator, means connecting said actuator to at least one cylinder of said engine whereby said movable means will be actuated by the average pressure in said cylinder to provide said control mechanism with an indication of torque load, and said actuator including a first pressure chamber in which said movable means is mounted and safety means operative to move said movable means when pressure is lost in said first chamber.

3. A mechanism as claimed in claim 2 wherein said safety means includes a second pressure chamber connected to said cylinder pressure whereby said safety means is inoperative when pressure exists in said chamber.

4. A mechanism as claimed in claim 3 wherein said safety means includes a piston in said second chamber having biasing means active thereon when pressure is lost in said chamber whereby said safety means will move said movable means in a direction to indicate high engine torque load.

5. A mechanism as claimed in claim 3 including connecting means connecting said first and second chambers to provide for communication of the pressure in said first chamber to the pressure in said second chamber.

6. A mechanism as claimed in claim 3 including check valve means in said connection to said second pressure chamber to retain pressure therein when cylinder pressure is lost in said means connecting said actuator with said engine.

7. A mechanism for developing a signal responsive to torque output of an internal combustion automotive engine, an automatic transmission for said engine, a control mechanism for said automatic transmission, said mechanism comprising a pressure responsive actuator connected to said control mechanism, said pressure responsive actuator having means movable in response to a pressure applied to said actuator, means connecting said actuator to at least one cylinder of said engine whereby said movable means will be actuated by the average pressure in said cylinder to provide said control mechanism with an indication of torque load, and vent valve means in the connection between the engine cylinder and said actuator adapted to vent condensed liquids from said connection.

8. A mechanism as claimed in claim 1 including a filter device in said connection for preventing contaminants from reaching said actuator.

* * * * *